United States Patent [19]
Pippy

[11] Patent Number: 5,222,458
[45] Date of Patent: Jun. 29, 1993

[54] APPARATUS FOR MONITORING MOVING AQUATIC ORGANISMS

[75] Inventor: John H. C. Pippy, St. John's, Canada

[73] Assignee: Her Majesty the Queen in right of Canada, as represented by the Department of Fisheries and Oceans, Ottawa, Canada

[21] Appl. No.: 840,182

[22] Filed: Feb. 24, 1992

[30] Foreign Application Priority Data

Dec. 17, 1991 [CA] Canada .................................. 2057833

[51] Int. Cl.⁵ ............................................. A01K 63/00
[52] U.S. Cl. ........................................ 119/5; 434/297
[58] Field of Search ................ 119/3, 5; 434/295, 296, 434/297

[56] References Cited

U.S. PATENT DOCUMENTS

| | | | |
|---|---|---|---|
| 3,040,980 | 6/1962 | Mann et al. | 235/98 |
| 4,392,236 | 7/1983 | Sandstrom et al. | 119/3 |
| 4,743,742 | 5/1988 | Espedalen | 235/1 |
| 4,951,607 | 8/1990 | Lapeyre | 119/5 |
| 5,073,115 | 12/1991 | Howell | 119/5 |

FOREIGN PATENT DOCUMENTS

| | | | |
|---|---|---|---|
| 1070797 | 1/1980 | Canada | 340/124.1 |
| 2009647 | 8/1990 | Canada | 340/124.1 |
| 3256855 | 10/1988 | Japan | 119/3 |
| 64-50959 | 2/1989 | Japan | |
| 0695630 | 11/1979 | U.S.S.R. | 119/5 |

OTHER PUBLICATIONS

M. L. Beach—"The Use of Infra Red Light and Closed Circuit T.V. to Validate Records from Automatic Fish Counters", J. Fish. Biol. (1978) 13, 639–644.

H. R. Schroeder—"Practical Illumination Concept and Technique for Machine Vision Applications", Proceedings of the Society of Photo-Optical Instrumentation Engineers-vol. 230 Apr. 8–9, 1980.

J. R. Irvine, et al. Evaluation of a Method to Count and Measure Live Salmonides in the Field with a Video Camera & Computer North American Journal of Fisheries Management Nov. 20–26, 1991 pp. 20–26.

Primary Examiner—Gene Mancene
Assistant Examiner—Todd E. Manahan
Attorney, Agent, or Firm—Ronald G. Bitner

[57] ABSTRACT

High contrast silhouette images of moving aquatic organisms against a brightly lit background are provided with an apparatus which comprises a tunnel with transparent top and front walls for confining the motion of aquatic organisms, retroreflective surfaces associated with the rear and bottom wall of the tunnel, a mirror, a camera, a light source and a camera support. Tunnel edges are provided with retroreflective surfaces to provide brightly lit borders to facilitate machine vision. Arrangements are described for determining organism size.

11 Claims, 3 Drawing Sheets

APPARATUS FOR MONITORING MOVING AQUATIC ORGANISMS

FIELD OF THE INVENTION

This invention relates to an apparatus for monitoring moving aquatic organisms.

BACKGROUND OF THE INVENTION

Considerable resources are spent by government, university and industrial agencies in identifying and counting of commercially important fish and other aquatic organisms. Manual collection of such information consumes considerable time, is subject to human error, and tends to cause changes in the behaviour of the organisms. Accordingly, it would be desirable if the identifying and counting of aquatic organisms could be achieved without constant human monitoring.

A number of devices are known for the detecting and counting of fish and other aquatic organisms. Examples of prior devices are disclosed in U.S. Pat. Nos. 3,040,980, 4,743,742 and Canadian patent No. 1,070,707. A device that includes the use of a TV camera is disclosed by M. H. Beach - The use of infra-red and closed circuit TV to validate records form automatic fish counters - *J. Fish Biol.* (1978).

Machine vision is most efficient when the image of interest is presented as a silhouette with a uniform brightly lit background. Also, with a machine vision system using a perimeter tracing algorithm, it is desirable that the entire target remain within a brightly lit background.

The conventional approach for providing a silhouette image has the lighting behind the object. The known systems used for monitoring aquatic organisms are not entirely satisfactory in providing high quality images under a wide variety of changing environmental conditions, including variation of light intensity for night and day, water current flow an depth, and water color and turbidity. Also, the known systems are inefficient in the utilization of energy for producing illumination, which is particularly significant to operating in remote locations.

SUMMARY OF THE INVENTION

An object of the present invention is to an apparatus that enable the production of high contrast silhouette images to facilitate the counting and measuring of moving aquatic organisms.

A more specific object for a specific embodiment of the invention is to provide an apparatus that provides a silhouette image with a uniform brightly lit background and includes a brightly lit border to facilitate use by a machine vision system that uses a perimeter tracing algorithm.

In accordance with the present invention there is provided an apparatus for monitoring aquatic organisms comprising; a tunnel for confining the lateral and vertical motion of moving aquatic organisms, said tunnel having transparent top and front walls, a rear wall, and a bottom wall; a first retroreflective surface associated with the rear wall of the tunnel, and a second retroreflective surface associated with the bottom wall of the tunnel; an image sensing device; a light source; support means for supporting the image sensing device in front of the tunnel and the light source in proximity with the image sensing device for directing light towards the retroreflective surface; a mirror positioned above the top wall for reflecting light reflected from the second retroreflective surface; the top, bottom, front and rear walls of the tunnel disposed in planes at angles that correspond with the optical path to the image sensing device to render the walls substantially invisible to the image sensing device; said image sensing device, light source and mirror being positioned relative to the tunnel to receive reflected light from the first retroreflective surface, and the second retroreflective surface via the mirror, such that an image as viewed by the image sensing device includes a front view and a top view of the tunnel that appears in the form of a brightly lit background, and whereby a passing organism appears as a silhouette.

DESCRIPTION OF THE PREFERRED EMBODIMENTS

Figure 1:
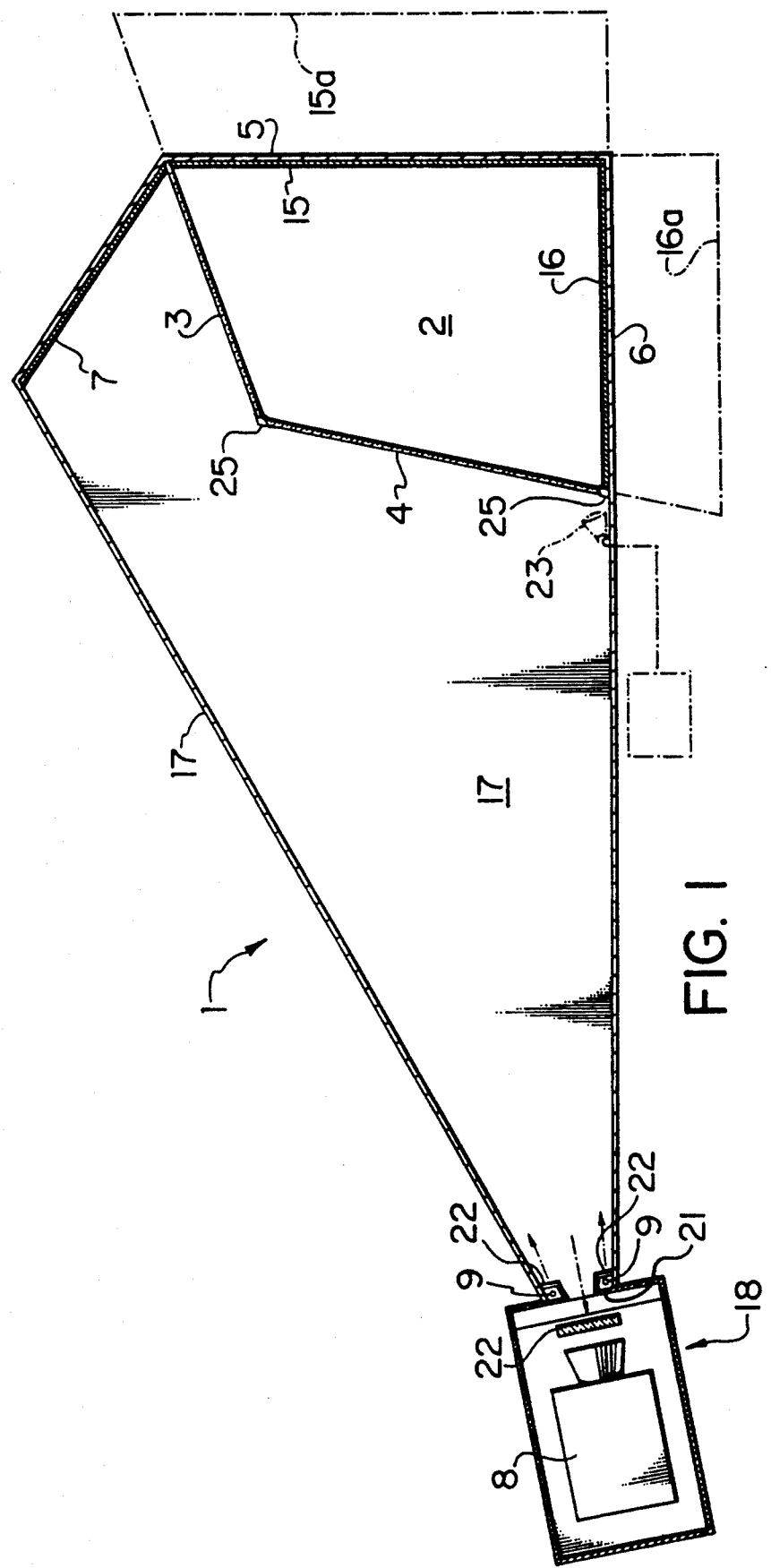
FIG. 1 is a schematic representation of the apparatus of the present invention.
Figure 2:
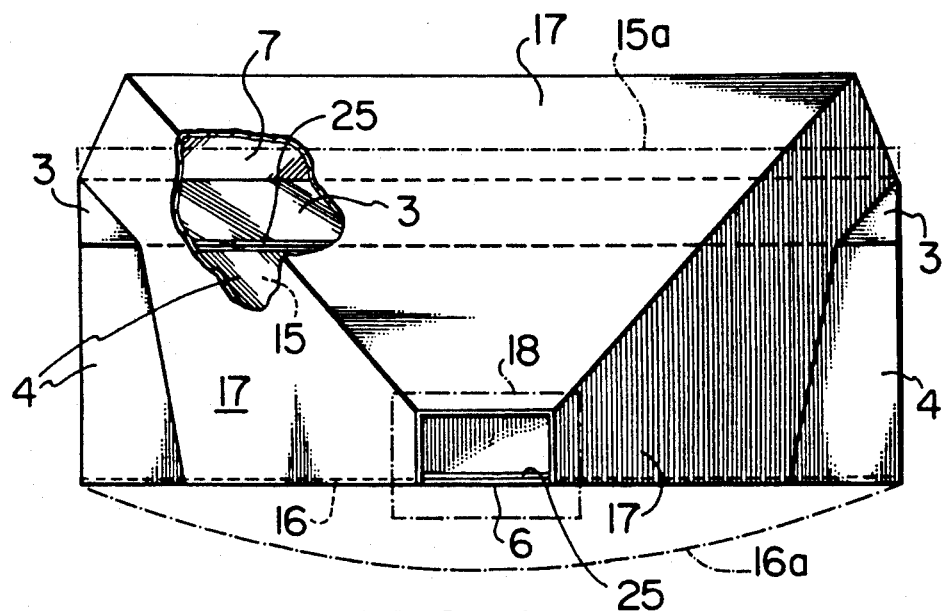
FIG. 2 is a front view the apparatus of FIG. 1.

With reference to FIGS. 1 and 2 of the drawings, the apparatus 1 of the present invention comprises a tunnel 2 which confines the lateral and vertical motion of passing aquatic organisms. The tunnel 2 includes a transparent top wall 3, transparent front wall 4, rear wall 5 and bottom wall 6. Associated with the rear wall 5 of the tunnel is shown a first generally vertical retroreflective surface 15 or 15a, and associated with the bottom wall 6 of the tunnel 2 is a second generally horizontal retroreflective surface 16 or 16a.

Shown attached to the front of the tunnel 2 is a water filled enclosure 17 to which is mounted a image sensing device shown as a camera 8 and light source 9. The enclosure 17 fixes the position of the camera 8 relative to the tunnel 2 with suitable mounting means 18. The enclosure prevents organisms or other extraneous objects from passing in front of the tunnel into the field of view of the camera 8. As shown, the arrangement of the enclosure 17 provides for viewing by the camera 8 along a generally horizontal axis to provide a front view and a top view, with the use of a mirror, as will be described. Preferably, the enclosure 17 has walls disposed at angles which minimize friction with flowing water and which do not obstruct the view of the tunnel 2 by the camera 8.

The tunnel 2 has top, bottom, front, and rear walls disposed in planes at angles aligned with the viewing angles of the camera. This provides that the inner wall surfaces of the tunnel will be substantially invisible to the camera, while at the same time allowing unobstructed viewing of the entire rear and bottom wall and all regions within the tunnel, particularly regions near the top, bottom, front and rear walls.

The front wall 4 of tunnel 2 will preferably be disposed at an angle, with respect to the light source 9 and camera 8, which avoids surface reflection of light directly back to the camers.

Positioned above the top wall 3 is a mirror 7 for reflecting light reflected from the retroreflective surface 16 or 16a and provides a top view of the interior of the tunnel 2.

The camera 8 is positioned to receive reflected light from the first retroreflective surface 15 or 15a, and the second retroreflective surface 16 or 16a via the mirror 7.

Figure 3:
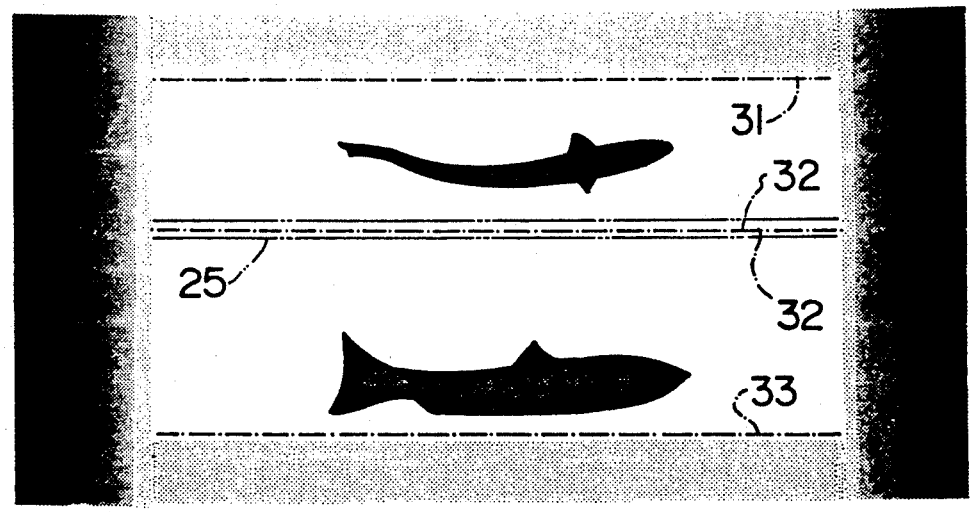
FIG. 3 is a schematic representation of an image as seen by the image sensing device that includes a front and top view of the target organism.

The mirror 7 is disposed at an angle to provide a top view of the organism adjacent to the front view. A schematic representation of the image obtained is shown in FIG. 3. The pair of lines 31 and 32 delineate the top view while lines 32 and 33 delineate the front view.

A suitable material for the retroreflective surfaces was found to be Reflexite TM . With such retroreflective materials the intensity of the light reflected from the material is greatest when the entrance angle is least, and also when the observation angle is least. For this reason the illumination source should be as close to the lens of the camera as possible.

Light source 9, disposed in proximity with the lens of the camera 8, emits light towards the first retroreflective surface 15 or 15a, and the second retroreflective surface 16 or 16a via the mirror 7.

A mask 21 is shown in front of the lens of the camers 8 to limit the camera view to that of the monitored space and inhibits back-scatter of light from light source 9.

Auxiliary controlled lighting means 23 may be used to enable independent illumination of target organisms, enabling simultaneous subdued front lighting to create grey scale or continuous-tone photographs of target organism.

The lighting will preferably include filters 22 to match the wavelength to which eyes of the target organism are least sensitive.

The light source in combination with the retroreflective surfaces produces a brightly lit background while passing aquatic organisms appear as a silhouette. The use of retroreflective surfaces provides an efficient illuminating system requiring relatively little electrical energy and was found to be effective in photographing aquatic organisms in dirty water, or water containing bubbles.

To avoid dark lines in the image, the front and top facing edges of the tunnel walls will preferably be provided with strips 25 of retroreflective material to provide brightly lit horizontal borders for the top and front views of the tunnel. This facilitates machine vision utilization since a dark border could otherwise be confused with the dark target organisms which may contact the inside of the tunnel 2. Moreover, certain computer vision algorithms require that the target object does not go outside the selected view area or overlap with a dark background region. The retroreflective strips 25 ensure that an image of an organism will always be surrounded by a brightly lit border.

The high contrast images produced by the apparatus are suitable for machine vision and computer software applications, thus minimizing time required for image enhancement prior to analysis.

The light source 9 as shown in FIG. 1 comprises two lighting elements located in front the camera lens and as close as possible to the lens, with one element above the other below the lens.

Figure 4:
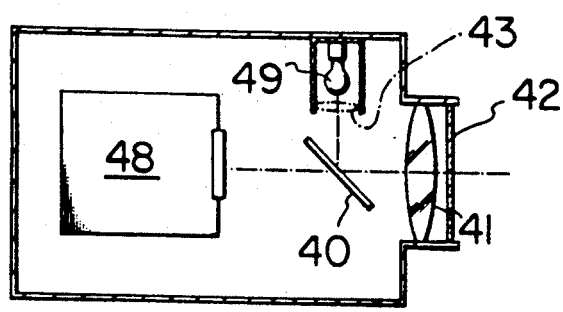
FIGS. 4 and 5 are schematic representations of alternate embodiments of arrangements of the light source and image sensing device for the apparatus.
Figure 5:
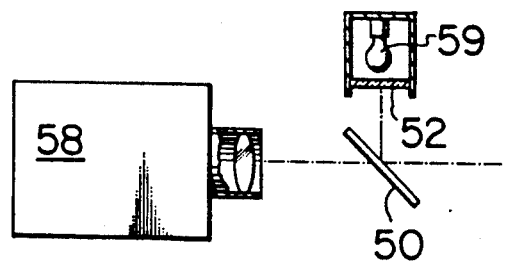

FIG. 4 shows schematically an alternate arrangement in which the light is introduced directly into the optical path of the lens by using a beam-splitter 40. In the specific arrangement illustrated, the light source 49 is placed behind the lens 41. The reflected light from the retroreflective passes back through the filter 42, lens 41, beam-splitter 40, to the camera 48. With this arrangement light is positioned to produce an even distribution of light on the retroreflective surfaces. A lens 43 may be used to facilite directing light as desired. Alteratively, as illustrated in FIG. 5, the light source 59, with filter 52, and beam-splitter 50 can be placed in front of the lens of camera 58. Also, it can be seen that the positioning of the camera and illumination means can be reversed with respect to the beam-splitter.

In one embodiment of the invention as shown in the drawings the retroreflective surfaces 15a and 16a are curved with the radius of curvature chosen to be substantially equal to the distance of the retroreflective surface from the camera 8. The curvature of the retroreflective surface provides that the background is uniform in brightness for the entire image providing high contrast for the target organisms.

In another embodiment of the invention the retroreflective surface 15 and 16 are flat. With flat retroreflective surfaces the reflected light tends to diminish towards the ends of the tunnel so it is desirable that the light source provide non-uniform lighting to the retroreflective surfaces whereby a greater light intensity is directed towards the ends such that the light reflected to the camera is substantially uniform.

The use of coloured, transparent sides, in combination with a complementary filter in front of the camera, and a complementary coloured light for the retroreflective surface, eliminates most ambient light from the system and enables full control of light entering the camers.

A standard, security style of television camera was found to be suitable for creating images of moving organisms. Such a camera was mounted in a waterproof housing attached to the atrium and employed a red filter to filter blue-green light from the sun during daylight hours and to enhance contrast. A barrier forming enclosure 17 of transparent blue Lexan TM with a metallic frame was found to provide the ruggedness required for field operations. The transparent blue material filters red light from the sun.

The present invention may also includes means to determine the size of the moving organisms. In order to determine organism size the passing organism must either by confined to a constant distance from the camera, or the distance of the organism from the camera must be determined. Embodiments of suitable systems are illustrated in FIGS. 6 and 7.

Figure 6:
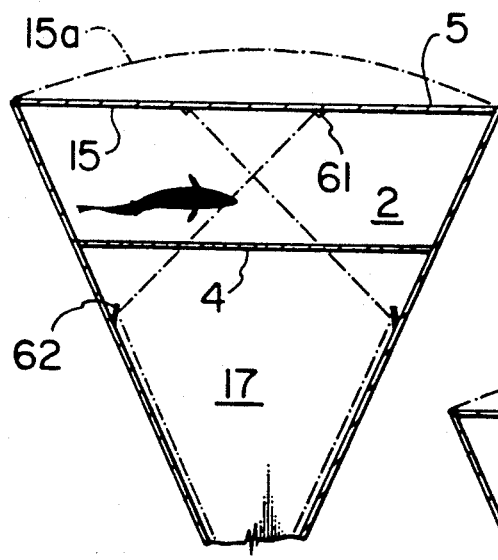
FIG. 6 shows a partial top view illustrating one embodiment of a rangefinder system.

FIG. 6 illustrates one embodiment of a system for determining the distance of the organism from the camera. The system includes two rangefinders each comprising a retroreflective 61 and side mirror 62. Each rangefinder is used to determine the camera to target distance of a specific part of a target's body (eg. nose or dorsal fin). The location of a target when a specific part of the target is reflected in a side mirror 62, and the target's location at the point in time, can be used to determined the distance of that part from the camera. The dual nature of the system is useful to determine the direction of movement or the angle of the target movement with respect to the camera.

An alternate system determines the distance from camera to target by viewing the target from above through the use of an appropriately angled top mirror.

Figure 7:
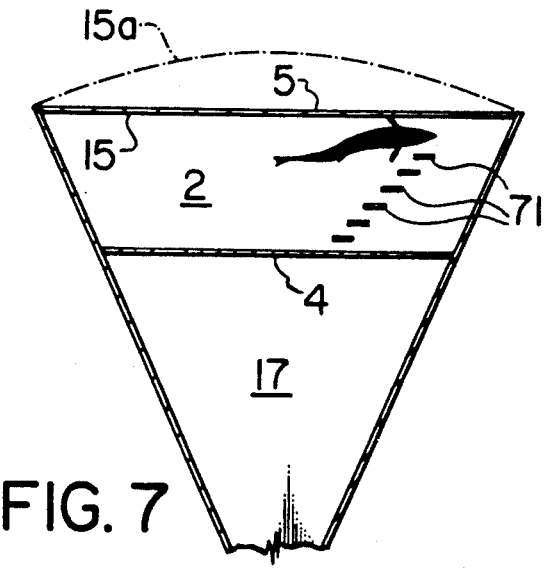
FIG. 7 shows a partial top view illustrating another embodiment of a rangefinder system.

FIG. 7 illustrates a simple system that facilitates determining organism size by using a series of vertical, transparent guides 71 arranged such that target organism are guided through an opening just wide enough for them to pass through, whereby all organisms will pass at substantially the same distance from the camera. The guides are preferably located toward one end of the tunnel or the other, and not perpendicular, so that they do not reflect light back to the camera. Also, to minimize their visibility to the camera, all vertical edges are angled such that they are parallel to the light path between the light and camera.

The apparatus is adaptable to a wide range of sizes of aquatic organisms by changing the effective tunnel size by placing a smaller tunnel(s) within the main tunnel, the other appropriate changes such as the focal length of the camera's lens, the geometry of the optical mask, etc. It will be understood that the enclosure 17 could take various forms or shapes.

What is claimed is;

1. An apparatus for monitoring aquatic organisms comprising;
    a tunnel for confining the lateral and vertical motion of moving aquatic organisms, said tunnel having transparent top and front walls, a rear wall, and a bottom wall;
    a first retroreflective surface associated with the rear wall of the tunnel, and a second retroreflective surface associated with the bottom wall of the tunnel;
    an image sensing device;
    a light source;
    support means for supporting the image sensing device in front of the tunnel and the light source in proximity with the image sensing device for directing light towards the retroreflective surfaces;
    a mirror positioned above the top wall for reflecting light reflected from the second retroreflective surface;
    said top, bottom, front and rear walls of the tunnel disposed in planes at angles aligned with the viewing angles of the image sensing device to render the walls substantially invisible to the image sensing device;
    said image sensing device, light source and mirror being positioned relative to the tunnel to receive reflected light from the first retroreflective surface, and the second retroreflective surface via the mirror, such that an image as viewed by the image sensing device includes a front view and a top view of the tunnel that appears in the form of a brightly lit background, and whereby a passing organism appears as a silhouette.

2. The apparatus of claim 1 wherein the front wall is disposed at an angle, with respect to the light source and the image sensing means, which avoids surface reflection from the light source directly back to the image sensing means.

3. The apparatus of claim 1 further comprising strips of retroreflective material attached to the front and top facing edges of the tunnel walls to provide brightly lit horizontal borders for the top and front views of the tunnel as viewed by the image sensing device.

4. The apparatus of claim 1 further comprising barrier means disposed between the image sensing device and tunnel for preventing objects from entering the region between the image sensing device and tunnel.

5. The apparatus of claim 4 wherein the barrier means comprises a transparent enclosure for containing water and disposed between the image sensing device and tunnel and wherein the transparent enclosure defines the support means for mounting the image sensing device relative to the tunnel.

6. The apparatus of claim 1 wherein the retroreflective surfaces are curved and have a radius of curvature substantially equal to the distance of the retroreflective surface from the image sensing device such that the light reflected to the image sensing device is substantially uniform.

7. The apparatus of claim 1 wherein the retroreflective surfaces are flat and wherein the light source provides non-uniform intensity of light to the retroreflective surfaces such that a greater light intensity is directed towards the outer sides such that the light reflected to the image sensing device is substantially uniform.

8. The apparatus of claim 1 further comprising means for determining the distance of a target organism from the image sensing device to facilitate organism size determination.

9. The apparatus of claim 1 further comprising guides disposed in the tunnel for confining the transverse travel of the target organism to provide that the organism passes at a known distance from the image sensing device to facilitate organism size determination.

10. The apparatus of claim 1 further comprising auxiliary lighting means positioned for illuminating the front of the target organism to provide a grey scale image.

11. The apparatus of claim 1 further comprising a beam-splitter disposed in the optical path between the image sensing device and retroreflective surfaces for receiving reflected illumination from the light source.

* * * * *